United States Patent
Molinari et al.

(10) Patent No.: US 11,703,870 B2
(45) Date of Patent: Jul. 18, 2023

(54) METHOD FOR COMPUTING MANEUVERS DRIVABLE SPACE USING PIECEWISE SEMANTIC AGGREGATION OF TRAJECTORIES

(71) Applicant: TOYOTA RESEARCH INSTITUTE, INC., Los Altos, CA (US)

(72) Inventors: Daniele Molinari, Redwood City, CA (US); Constantin Hubmann, Menlo Park, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 186 days.

(21) Appl. No.: 17/317,775

(22) Filed: May 11, 2021

(65) Prior Publication Data
US 2022/0365539 A1   Nov. 17, 2022

(51) Int. Cl.
*G05D 1/02* (2020.01)
*B60W 60/00* (2020.01)

(52) U.S. Cl.
CPC ......... *G05D 1/0214* (2013.01); *B60W 60/001* (2020.02); *B60W 2552/10* (2020.02); *G05D 2201/0213* (2013.01)

(58) Field of Classification Search
CPC ........ G05D 1/0214; G05D 2201/0213; B60W 60/001; B60W 2552/10; G01C 21/30
See application file for complete search history.

(56) References Cited

U.S. PATENT DOCUMENTS

| | | | |
|---|---|---|---|
| 9,606,963 B2 | 3/2017 | Lygeros et al. | |
| 2017/0337813 A1 | 11/2017 | Taylor et al. | |
| 2018/0012137 A1 | 1/2018 | Wright et al. | |
| 2019/0286153 A1* | 9/2019 | Rankawat | G06F 18/24143 |
| 2019/0361450 A1 | 11/2019 | Sheckells et al. | |
| 2021/0012120 A1 | 1/2021 | Gummadi et al. | |

FOREIGN PATENT DOCUMENTS

| | | |
|---|---|---|
| CN | 111291790 A | 6/2020 |
| WO | 2020112827 | 6/2020 |

OTHER PUBLICATIONS

Martinsson, et al., "Clustering Vehicle Maneuver Trajectories Using Mixtures of Hidden Markov Models", 21st International Conference on Intelligent Transportation Systems (ITSC), Maui, Hawaii, USA, Nov. 4-7, 2018.
Kalayeh, et al., "Understanding Trajectory Behavior: A Motion Pattern Approach", arXiv:1501.00614, Jan. 4, 2015.

(Continued)

*Primary Examiner* — Rodney A Butler
(74) *Attorney, Agent, or Firm* — Seyfarth Shaw LLP

(57) ABSTRACT

A method of determining a drivable space trajectory of an ego vehicle is described. The method includes determining a set of vehicle trajectories corresponding to a same semantic driving maneuver during motion planning of the ego vehicle. The method also includes identifying the drivable space trajectory to perform the same semantic driving maneuver. The method further includes performing a vehicle control action to maneuver the ego vehicle along the drivable space trajectory.

14 Claims, 9 Drawing Sheets

(56) References Cited

OTHER PUBLICATIONS

Choong, et al., "Modeling of Vehicle Trajectory Clustering based on LCSS for Traffic Pattern Extraction," IEEE 2nd International Conference on Automatic Control and Intelligent Systems, pp. 74-79, 2017.
Li, et al., "A Piecewise Trajectory Optimization Model for Connected Automated Vehicles: Exact Optimization Algorithm and Queue Propagation Analysis," Transportation Research Part B: Methodological, vol. 118, pp. 429-456, 2018.
Wooden, David T., "Graph-based Path Planning for Mobile Robots," Georgia Tech Theses and Dissertations, 114 pages, 2006.
Vega-Brown, et al., "Asymptotically optimal planning under piecewise-analytic constraints," Springer Proceedings in Advanced Robotics, vol. 13, pp. 528-543, 2020.
Liu, Xinfu, "Autonomous Trajectory Planning by Convex Optimization," Iowa State University Capstones, Thesis and Dissertations, 155 pages, 2013.
De Silva, et al., "Towards Combining HTN Planning and Geometric Task Planning," Combined Robot Motion Planning and AI Planning for Practical Applications, pp. 1-6, 2013.
Choong, et al., "Vehicle Trajectory Clustering for Traffic Intersection Surveillance," 2016 IEEE International Conference on Consumer Electronics—Asia, pp. 1-4, 2016.

\* cited by examiner

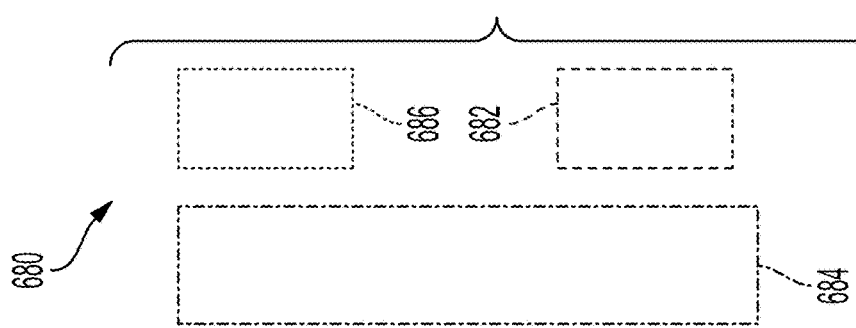
*FIG. 6D* Step 4
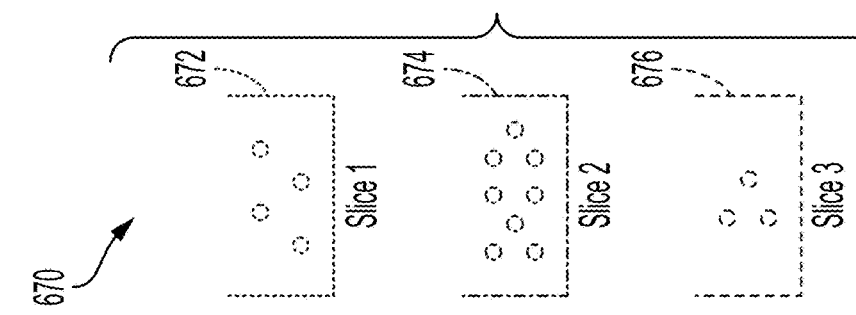
*FIG. 6C* Step 3
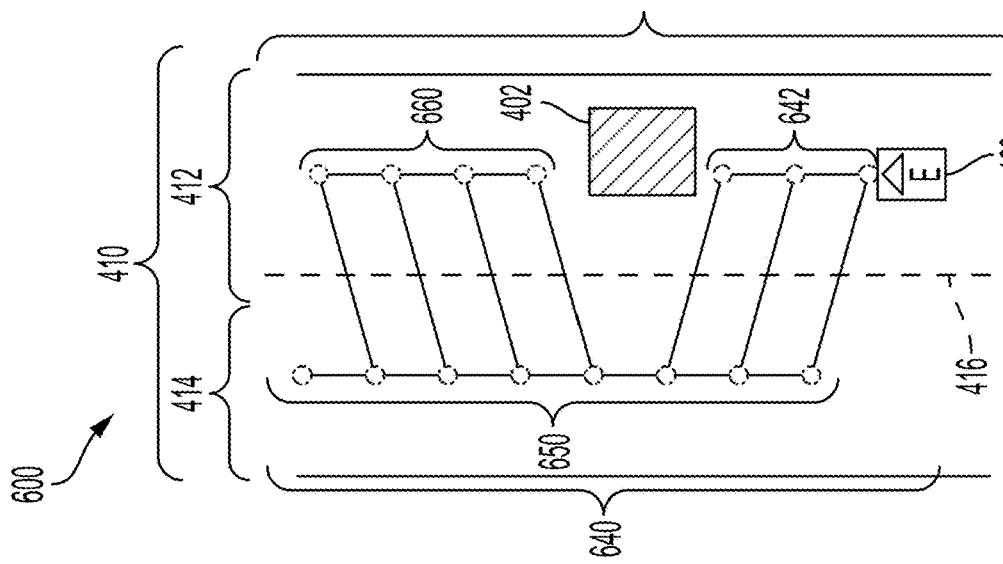
*FIG. 6B* Step 2
*FIG. 6A* Step 1

METHOD FOR COMPUTING MANEUVERS
DRIVABLE SPACE USING PIECEWISE
SEMANTIC AGGREGATION OF
TRAJECTORIES

BACKGROUND

Field

Certain aspects of the present disclosure generally relate to autonomous vehicle technology and, more particularly, to computing a maneuvers' drivable space using piecewise semantic aggregation of trajectories.

Background

Autonomous agents rely on machine vision for sensing a surrounding environment by analyzing areas of interest in a scene from images of a surrounding environment. Although scientists spent decades studying the human visual system, a solution for realizing equivalent machine vision remains elusive, but is a goal for enabling truly autonomous agents. Machine vision, however, is distinct from the field of digital image processing. In particular, machine vision involves recovering a three-dimensional (3D) structure of the world from images and using the 3D structure for fully understanding a scene. That is, machine vision strives to provide a high-level understanding of a surrounding environment, as performed by the human visual system.

Autonomous agents, such as driverless cars and robots, are quickly evolving and have become a reality in this decade. Because autonomous agents have to interact with humans, however, many critical concerns arise. For example, how to design vehicle control of an autonomous vehicle using machine learning. Unfortunately, vehicle control by machine learning is less effective in complicated traffic environments involving complex interactions between vehicles (e.g., a situation where a controlled (ego) vehicle merges/changes onto/into a traffic lane).

Machine learning techniques for vehicle control using a network to select a vehicle control action for an ego vehicle are desired. For example, a selected speed/acceleration/steering angle of the controlled (ego) vehicle may be applied as a vehicle control action. These conventional machine learning techniques do not consider the use of piecewise semantic aggregation of trajectories to compute the drivable space for motion planning and maneuvering.

SUMMARY

A method of determining a drivable space trajectory of an ego vehicle is described. The method includes determining a set of vehicle trajectories corresponding to a same semantic driving maneuver during motion planning of the ego vehicle. The method also includes identifying the drivable space trajectory to perform the same semantic driving maneuver. The method further includes performing a vehicle control action to maneuver the ego vehicle along the drivable space trajectory.

A non-transitory computer-readable medium having program code recorded thereon to determine a drivable space trajectory of an ego vehicle is described. The program code is executed by a processor. The non-transitory computer-readable medium includes program code to determine a set of vehicle trajectories corresponding to a same semantic driving maneuver during motion planning of the ego vehicle. The non-transitory computer-readable medium also includes program code to identify the drivable space trajectory to perform the same semantic driving maneuver. The non-transitory computer-readable medium further includes program code to perform a vehicle control action to maneuver the ego vehicle along the drivable space trajectory.

A system determine a drivable space trajectory of an ego vehicle is described. The system includes a vehicle trajectory aggregation module to determine a set of vehicle trajectories corresponding to a same semantic driving maneuver during motion planning of the ego vehicle. The system also includes a drivable trajectory identification module to identify the drivable space trajectory to perform the same semantic driving maneuver. The system further includes a vehicle control selection module to perform a vehicle control action to maneuver the ego vehicle along the drivable space trajectory.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 6A-6D are block diagrams illustrating computation of a more accurate representation of the drivable space using the process of FIG. 5, according to aspects of the present disclosure.

DETAILED DESCRIPTION

Figure 1:
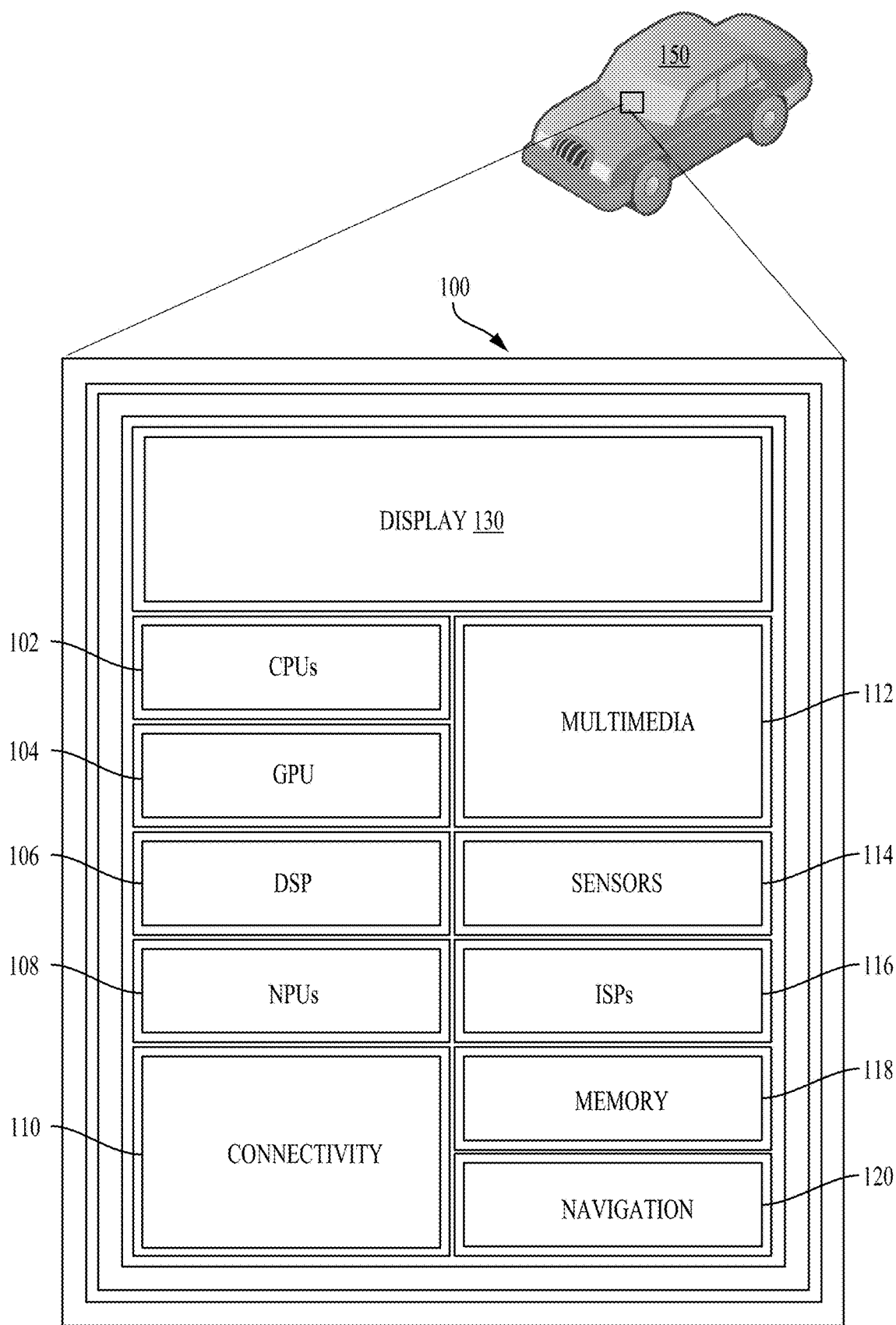
FIG. 1 illustrates an example implementation of designing a neural network using a system-on-a-chip (SOC) for a vehicle behavior control system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Traffic congestion on highways affects millions of people and presents an urgent problem to solve. In particular, vehicles at highway merging sections (e.g., such as on-ramp and land-drop bottlenecks) perform lane changes, which may generate traffic oscillations and extra congestion. Both main-lane and on-ramp traffic are potentially congested due to irregular lane change behavior and unexpected braking maneuvers of surrounding vehicles. Automated vehicles are expected to reduce traffic accidents and improve traffic efficiency. In particular, automation of vehicle control on highways is rapidly advancing, which may eventually reduce traffic accidents and improve traffic efficiency.

Reducing traffic congestion may be achieved by effectively directing timing and speed of controlled vehicles. For example, the timing and speed of vehicles is controlled when maneuvering in traffic in a manner that does not detrimentally affect traffic on the roadway. According to one aspect of the present disclosure, a vehicle behavior control system is described for motion planning and maneuvering of a controlled vehicle, while reducing the traffic impact on the roadway.

Vehicle control by machine learning is less effective in complicated traffic environments. For example, these traffic environments may involve complex interactions between vehicles, including situations where a controlled (ego) vehicle maneuvers into and out of traffic lanes. Conventional machine learning techniques for vehicle control may use a network to select an appropriate vehicle control action from input data relative to the ego vehicle. For example, a selected speed/acceleration/steering angle of the controlled (ego) vehicle may be applied as a vehicle control action to perform a vehicle control maneuver. Unfortunately, conventional machine learning techniques are based on a single trajectory regression and do not leverage the availability of existing motion planning techniques. By contrast, elements of the present disclosure allow for increased compatibility with generic trajectory planning and motion control algorithms through piecewise semantic aggregation of trajectories to determine a drivable space.

For example, when an autonomous vehicle (AV) is driving on a roadway with multiple lanes, conventional approaches plan actions at discrete time intervals, as determined by a vehicle perception system. The vehicle perception system can include a number of different sensors, such as cameras, a light detection and ranging (LIDAR) sensor or a radio detection and ranging (RADAR) sensor, sonar, or other like sensor. Unfortunately, conventional approaches of planning actions at discrete time intervals result in a mesh of potential trajectories for the autonomous vehicle. Some of these trajectories, however, result in the same qualitative maneuver.

Aspects of the present disclosure are directed to improving the determination of a drivable space from a set of trajectories for a driving maneuver by an autonomous vehicle (AV). Conventional automated vehicle systems simply estimate or plan motion from a set of trajectories. One aspect of the present disclosure improves motion planning using slices of graph points. These aspects of the present disclosure identify a drivable space the vehicle is allowed to occupy when performing a specific maneuver given a set of trajectories that represents the same qualitative maneuver. The drivable space for the maneuver is selected by computing a piecewise semantic aggregation of trajectories that represents the same qualitative maneuver as the selected driving maneuver.

FIG. 1 illustrates an example implementation of the aforementioned system and method for a vehicle behavior control system using a system-on-a-chip (SOC) 100 of an autonomous vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fifth generation (5G) cellular network technology, fourth generation long term evolution (4G LTE) connectivity, unlicensed WiFi connectivity, USB connectivity, Bluetooth® connectivity, and the like. In addition, a multimedia processor 112 in combination with a display 130 may, for example, apply a temporal component of a current traffic state to select a vehicle behavior control action, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the autonomous vehicle 150. In this arrangement, the autonomous vehicle 150 may include a processor and other features of the SOC 100. In this aspect of the present disclosure, instructions loaded into a processor (e.g., CPU 102) or the NPU 108 of the autonomous vehicle 150 may include program code to determine one or more merge gaps between vehicles in a target lane of a multilane highway based on images processed by the sensor processor 114. The instructions loaded into a processor (e.g., CPU 102) may also include program code to compute an exposure time in which the ego vehicle is specified to merge into the one or merge gaps, and program code to select a merge gap between a first vehicle and a second vehicle in the target lane of the multilane highway having a maximum exposure time.

Figure 2:
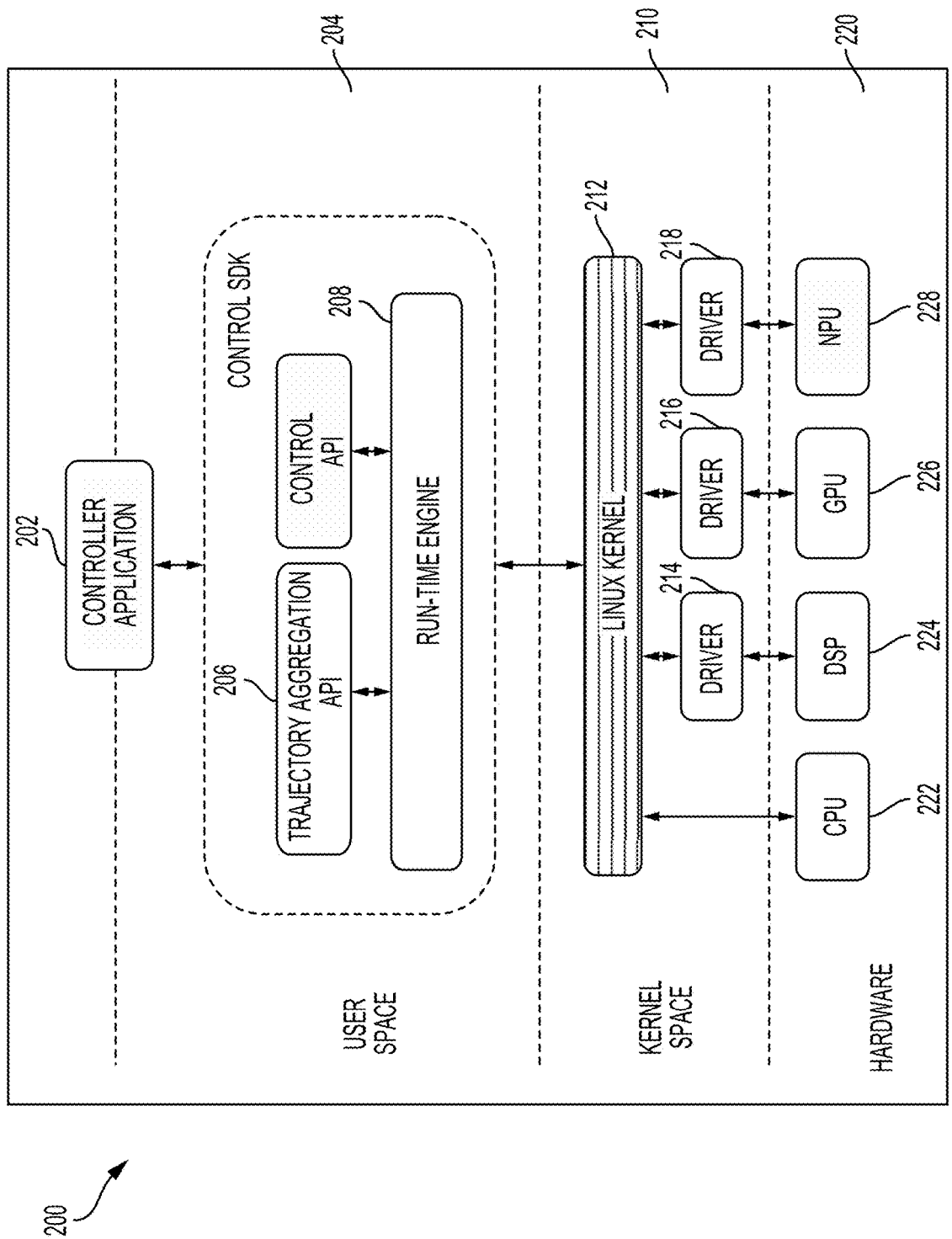
FIG. 2 is a block diagram illustrating a software architecture that may modularize artificial intelligence (AI) functions for a vehicle behavior control system of an autonomous agent, according to aspects of the present disclosure.

FIG. 2 is a block diagram illustrating a software architecture 200 that may modularize artificial intelligence (AI) functions for selecting a vehicle control action of an autonomous agent using a piecewise semantic aggregation of trajectories, according to aspects of the present disclosure. Using the architecture, a controller application 202 may be designed such that it may cause various processing blocks of a system-on-a-chip (SOC) 220 (for example a CPU 222, a DSP 224, a GPU 226, and/or an NPU 228) to perform supporting computations during run-time operation of the controller application 202. While FIG. 2 describes the software architecture 200 for selecting a vehicle control action of an autonomous agent, it should be recognized that vehicle action control functionality is not limited to autonomous agents. According to aspects of the present disclosure, vehicle action control functionality is applicable to any vehicle type, provided the vehicle is equipped with appropriate functions of an advanced driver assistance system (ADAS).

The controller application 202 may be configured to call functions defined in a user space 204 that may, for example, provide for vehicle action control services. The controller application 202 may make a request to compile program code associated with a library defined in a trajectory aggregation application programming interface (API) 206 to perform a vehicle behavior action control selection according to a drivable trajectory. Selection of the vehicle behavior control action may ultimately rely on the output of a convolutional neural network configured to select a vehicle control action of an autonomous agent to maneuver the vehicle along a drivable trajectory for performing a selected driving maneuver.

A run-time engine 208, which may be compiled code of a runtime framework, may be further accessible to the controller application 202. The controller application 202 may cause the run-time engine 208, for example, to take actions for controlling the autonomous agent. When an ego vehicle intends to merge onto a traffic lane, the run-time engine 208 may in turn send a signal to an operating system 210, such as a Linux Kernel 212, running on the SOC 220. FIG. 2 illustrates the Linux Kernel 212 as software architecture for implementing control of an autonomous agent using temporal traffic state information. It should be recognized, however, aspects of the present disclosure are not limited to this exemplary software architecture. For example, other kernels may be used to provide the software architecture to support vehicle control action selection functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
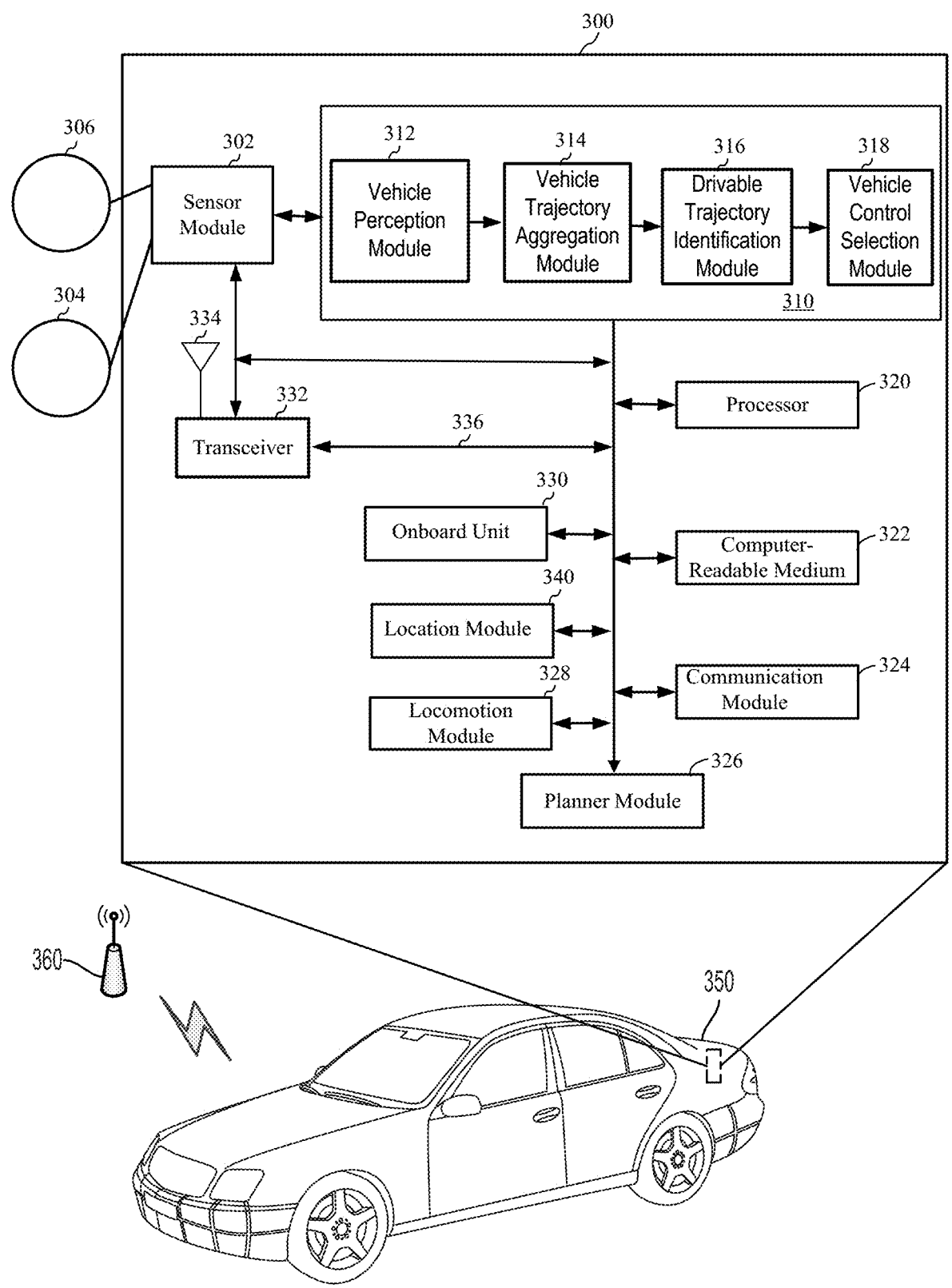
FIG. 3 is a diagram illustrating an example of a hardware implementation for a vehicle behavior control system, according to aspects of the present disclosure.

FIG. 3 is a diagram illustrating an example of a hardware implementation for a vehicle behavior control system 300, according to aspects of the present disclosure. The vehicle behavior control system 300 may be configured for improved drivable trajectory identification for an ego vehicle. The vehicle behavior control system 300 may be a component of a vehicle, a robotic device, or other non-autonomous device (e.g., non-autonomous vehicles, rideshare cars, etc.). For example, as shown in FIG. 3, the vehicle behavior control system 300 is a component of a car 350.

Aspects of the present disclosure are not limited to the vehicle behavior control system 300 being a component of the car 350. Other devices, such as a bus, motorcycle, or other like non-autonomous vehicle, are also contemplated for implementing the vehicle behavior control system 300. In this example, the car 350 may be autonomous or semi-autonomous; however, other configurations for the car 350 are contemplated, such as an advanced driver assistance system (ADAS).

The vehicle behavior control system 300 may be implemented with an interconnected architecture, represented generally by an interconnect 336. The interconnect 336 may include any number of point-to-point interconnects, buses, and/or bridges depending on the specific application of the vehicle behavior control system 300 and the overall design constraints. The interconnect 336 links together various circuits including one or more processors and/or hardware modules, represented by a sensor module 302, a vehicle behavior controller 310, a processor 320, a computer-readable medium 322, a communication module 324, a planner module 326, a locomotion module 328, an onboard unit 330, and a location module 340. The interconnect 336 may also link various other circuits such as timing sources, peripherals, voltage regulators, and power management circuits, which are well known in the art, and therefore, will not be described any further.

The vehicle behavior control system 300 includes a transceiver 332 coupled to the sensor module 302, the vehicle behavior controller 310, the processor 320, the computer-readable medium 322, the communication module 324, the planner module 326, the locomotion module 328, the location module 340, and the onboard unit 330. The transceiver 332 is coupled to antenna 334. The transceiver 332 communicates with various other devices over a transmission medium. For example, the transceiver 332 may receive commands via transmissions from a user or a connected vehicle. In this example, the transceiver 332 may receive/transmit vehicle-to-vehicle traffic state information for the vehicle behavior controller 310 to/from connected vehicles within the vicinity of the car 350.

The vehicle behavior control system 300 includes the processor 320 coupled to the computer-readable medium 322. The processor 320 performs processing, including the execution of software stored on the computer-readable medium 322 to provide functionality according to the disclosure. The software, when executed by the processor 320, causes the vehicle behavior control system 300 to perform the various functions described for vehicle behavior control (e.g., vehicle merging control) of the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LiDAR) sensor or a radio detection and ranging (RADAR) sensor. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the vehicle behavior controller 310, the communication module 324, the planner module 326, the locomotion module 328, the onboard unit 330, and/or the location module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the car 350 or may be in communication with the car 350.

The location module 340 may determine a location of the car 350. For example, the location module 340 may use a global positioning system (GPS) to determine the location of the car 350. The location module 340 may implement a dedicated short-range communication (DSRC)-compliant GPS unit. A DSRC-compliant GPS unit includes hardware and software to make the car 350 and/or the location module 340 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 332. For example, the communication module 324 may be configured to provide communication capabilities via different wireless protocols, such as 5G, WiFi, long term evolution (LTE), 4G, 3G, etc. The communication module 324 may also communicate with other components of the car 350 that are not modules of the vehicle behavior control system 300. The transceiver 332 may be a communications channel through a network access point 360. The communications channel may include DSRC, LTE, LTE-D2D, mmWave, WiFi (infrastructure mode), WiFi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, WiFi (infrastructure mode), WiFi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The vehicle behavior control system 300 also includes the planner module 326 for planning a route and controlling the locomotion of the car 350, via the locomotion module 328 for autonomous operation of the car 350. In one configuration, the planner module 326 may override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the car 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle behavior controller 310 may be in communication with the sensor module 302, the processor 320, the computer-readable medium 322, the communication module 324, the planner module 326, the locomotion module 328, the location module 340, the onboard unit 330, and the transceiver 332. In one configuration, the vehicle behavior controller 310 receives sensor data from the sensor module 302. The sensor module 302 may receive the sensor data from the first sensor 306 and the second sensor 304. According to aspects of the disclosure, the sensor module 302 may filter the data to remove noise, encode the data, decode the data, merge the data, extract frames, or perform other functions. In an alternate configuration, the vehicle behavior controller 310 may receive sensor data directly from the first sensor 306 and the second sensor 304 to determine, for example, input traffic data images.

Conventional machine learning techniques for vehicle control may use a network to select an appropriate vehicle control action from input data relative to the ego vehicle as determined by a vehicle perception system. The vehicle perception system can include a number of different sensors, such as cameras, a light detection and ranging (LIDAR) sensor or a radio detection and ranging (RADAR) sensor, sonar, or other like sensor. During operation of the car 350, a selected speed/acceleration/steering angle of the controlled (ego) vehicle may be applied as a vehicle control action to perform a vehicle control maneuver. Unfortunately, conventional machine learning techniques do not consider piecewise semantic aggregation of trajectories for motion planning and maneuvering when selecting vehicle control actions.

For example, when an autonomous vehicle (AV), such as the car 350, is driving on a roadway with multiple lanes, conventional approaches plan actions at discrete time intervals. Unfortunately, conventional approaches of planning actions at discrete time intervals result in a rough mesh of potential trajectories for the autonomous vehicle. Some of these trajectories, however, result in the same qualitative driving maneuver. As described, the same qualitative driving maneuver may refer to a set of driving trajectories that represents the same qualitative maneuver driving trajectories that correspond to the same semantic driving maneuver class, as determined by a vehicle perception system.

Aspects of the present disclosure are directed to improving the determination of a drivable space from a set of trajectories that correspond to the same driving maneuver performed by an autonomous vehicle (AV). Conventional automated vehicle systems simply estimate or plan motion from a set of trajectories. One aspect of the present disclosure improves motion planning using slices of graph points determined from the set of trajectories. These aspects of the present disclosure identify a drivable space the vehicle is allowed to occupy when performing a specific maneuver given a set of trajectories that represents the same qualitative maneuver.

As shown in FIG. 3, the vehicle behavior controller 310 includes a vehicle perception module 312, a vehicle trajectory aggregation module 314, a drivable trajectory identification module 316, and a vehicle control selection module 318. The vehicle perception module 312, the vehicle trajectory aggregation module 314, the drivable trajectory identification module 316, and the vehicle control selection module 318 may be components of a same or different artificial neural network, such as a deep convolutional neural network (CNN). The vehicle behavior controller 310 is not limited to a CNN. The vehicle behavior controller 310 receives a data stream from the first sensor 306 and/or the second sensor 304. The data stream may include a 2D RGB image from the first sensor 306 and LIDAR data points from the second sensor 304. The data stream may include multiple frames, such as image frames of traffic data.

The vehicle trajectory aggregation module 314 may be configured to aggregate a set of trajectories corresponding to a similar qualitative maneuver. In these aspects of the present disclosure, the vehicle trajectory aggregation module 314 is configured to determine a set of vehicle trajectories corresponding to a same qualitative driving maneuver during motion planning of the car 350. Once the same qualitative driving maneuver is identified, the drivable trajectory identification module 316 identifies a drivable trajectory to provide a space for the car 350 to occupy when performing the driving maneuver.

Finding the drivable space the car 350 is allowed to use in performing the driving maneuver is a problem of practical interest because it allows the vehicle control selection module 318 to more effectively perform the same qualitative driving maneuver. For example, a vehicle control behavior of the car 350 may be controlled by the vehicle behavior controller 310 in a manner for motion planning and maneuvering of the car 350 by using a drivable space trajectory the car 350 is allowed to use in performing the same qualitative driving maneuver, for example, as shown in FIG. 4.

Figure 4:
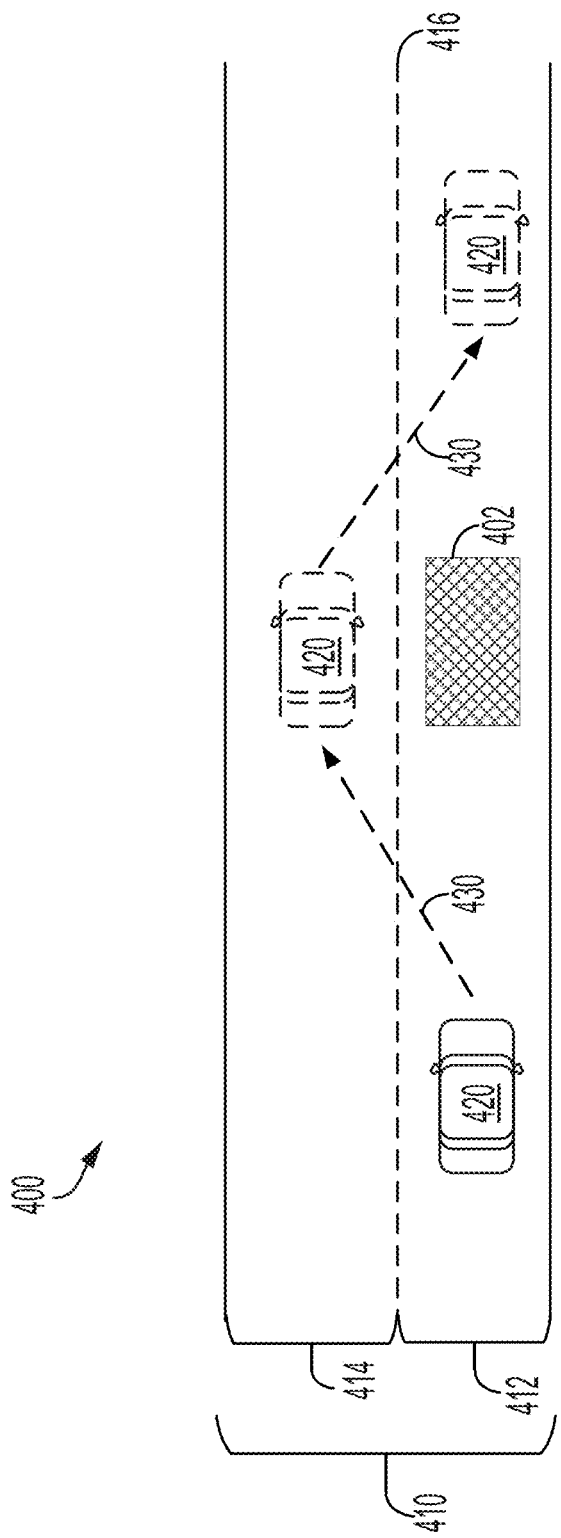
FIG. 4 is a diagram illustrating an overview of a roadway environment, including an obstruction in a first lane of a roadway and a controlled (ego) vehicle in the first lane of the roadway, according to aspects of the present disclosure.

FIG. 4 is a diagram illustrating an overview of a roadway environment, including an obstruction in a first lane of a roadway and a controlled (ego) vehicle in the first lane of the roadway, according to aspects of the present disclosure. In this example, a roadway environment 400 includes a roadway 410, having a first lane 412 in which an ego vehicle 420 is traveling in a second lane 414. In addition, the first lane 412 also includes an obstruction 402. In this example, the ego vehicle 420 is configured to monitor the dynamics of both vehicles/obstructions in the first lane 412, as well as vehicles/obstructions in the second lane 414 of the roadway 410. In this example, the ego vehicle 420, may be the car 350, shown in FIG. 3.

In one aspect of the present disclosure, the ego vehicle 420 is essentially controlled by a vehicle controller (e.g., the vehicle behavior controller 310 of FIG. 3). In this example, the ego vehicle 420 (e.g., the vehicle perception module 312 of FIG. 3) identifies the obstruction 402 in the first lane 412 of the roadway 410. That is, the ego vehicle 420 is configured to identify various driving trajectories corresponding to the same qualitative driving maneuver for avoiding the obstruction 402 in the first lane 412 of the roadway 410. According to aspects of the present disclosure, the ego vehicle 420 is configured to identify a drivable space from a set of trajectories that correspond to the same driving maneuver performed by the ego vehicle 420 to avoid the obstruction 402 in the first lane 412.

In this example, the roadway 410 is shown with two lanes, in which the ego vehicle 420 is in the rightmost lane (e.g., the first lane 412) and roadwork (e.g., the obstruction 402) is blocking the rightmost lane. Given a set of trajectories that represents the same qualitative driving maneuver, it's a problem of practical interest to find the drivable space the ego vehicle 420 is allowed to occupy when performing a selected driving maneuver 430. The ego vehicle 420 may be configured to identify the drivable space the ego vehicle 420 is allowed to occupy when performing a selected driving maneuver 430. In operation, the vehicle controller (e.g., vehicle control selection module 318 of FIG. 3) adjusts a speed and a trajectory of the ego vehicle 420 to perform a selected driving maneuver 430. In this example, if a target speed and/or trajectory of the ego vehicle 420 is not safe, the vehicle controller ignores the target speed and/or the trajectory and selects a different motion plan. Therefore, a collision avoidance function is provided by the vehicle controller (e.g., vehicle behavior controller 310).

Various driving trajectories are available for the ego vehicle 420 to perform the selected driving maneuver 430. Finding a drivable space the ego vehicle 420 is allowed to occupy when performing the selected driving maneuver 430 is a problem of practical interest. Aspects of the present disclosure provide a method for computing an accurate representation of the drivable space. Because the various driving trajectories represent the selected driving maneuver 430, they share the underlying structure, specific to the selected driving maneuver 430. In this example, the selected driving maneuver 430 involves a lane change, in which the action of crossing a dashed center line 416 between the first lane 412 and the second lane 414 may separate points in the original lane (e.g., the first lane 412) from the points in the target lane (e.g., the second lane 414). The points may represent various stages during maneuvering of the ego vehicle 420. These two groups of points may be computed regardless of where the ego vehicle 420 crosses the dashed center line 416, as shown in FIG. 6. A method for computing an accurate representation of the drivable space is shown in FIG. 5.

Figure 5:
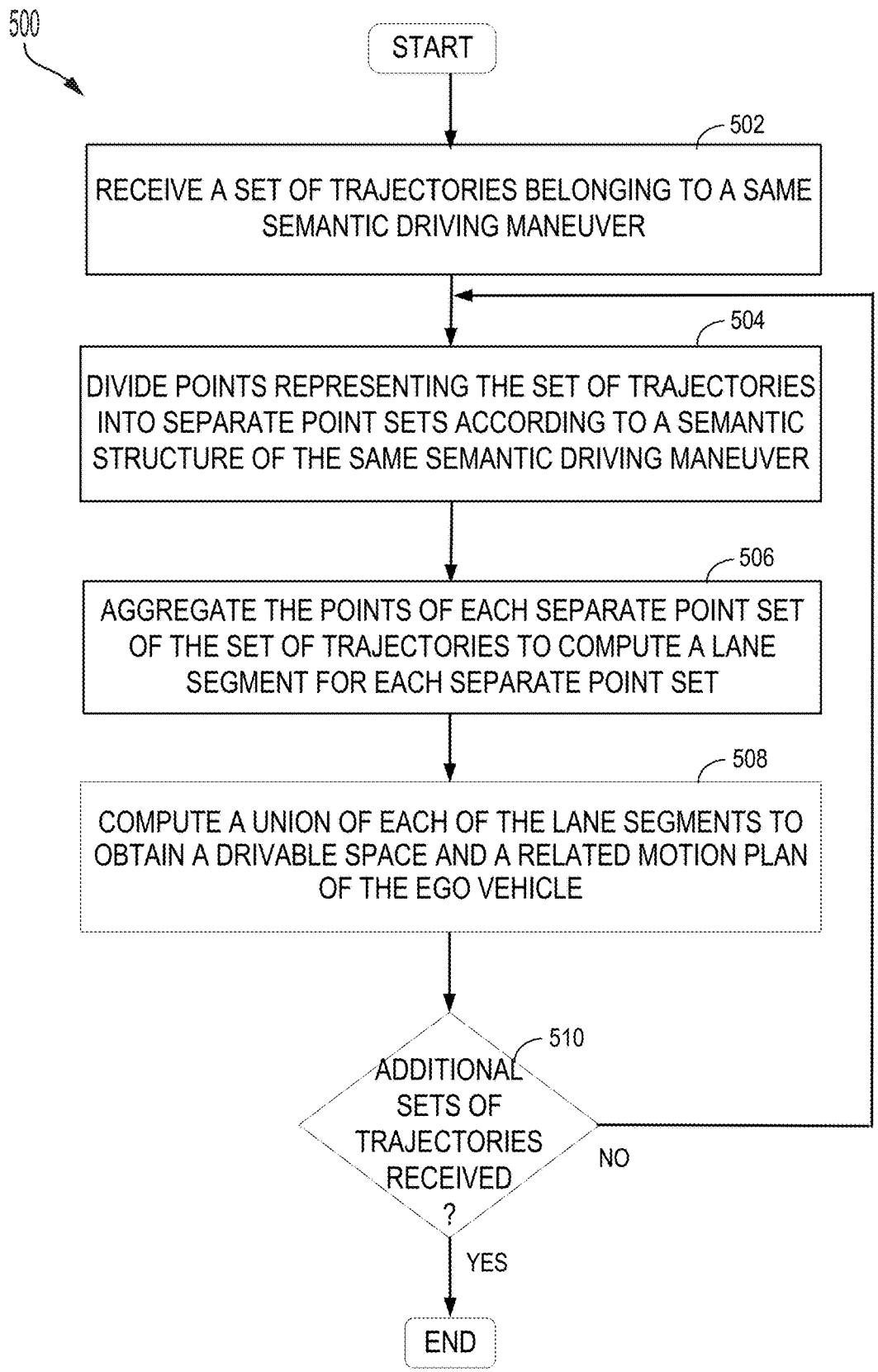
FIG. 5 is a flowchart illustrating a method of determining a drivable space from a set of trajectories for performing a selected driving maneuver by a controlled (ego) vehicle, according to aspects of the present disclosure.

FIG. 5 is a flowchart illustrating a method of determining a drivable space from a set of trajectories for performing a selected driving maneuver by a controlled (ego) vehicle, according to aspects of the present disclosure. FIGS. 6A-6D are block diagrams illustrating computation of a representation of the drivable space using the process of FIG. 5, according to aspects of the present disclosure. As illustrated in FIGS. 6A-6D, trajectories 640 that represent a similar maneuver may share an underlying structure specific to that maneuver. The trajectories 640 are composed on points within the first lane 412 or the second lane 414 and connecting line segments illustrating various lane changes, as well as continued travel in the same lane.

Referring again to FIG. 5, the method 500 begins at block 502, in which a set of trajectories belonging to a same semantic driving maneuver are received. For example, as shown in the method 600 of FIG. 6A, the set of trajectories 640 are received and represent the selected driving maneuver 430 of FIG. 4. In this example, a first set of points 642 illustrates travel in the first lane 412 prior to the obstruction 402. A second set of points 650 illustrates travel in the second lane 414 after crossing the dashed center line 416. A third set of points 660 illustrates travel in the first lane 412 after changing lanes to avoid the obstruction 402. For example, as illustrated in step 1 of FIG. 6A, an action for a lane change involves crossing the dashed center line 416 that separates the first set of points 642 in the original lane (e.g., the first lane 412) from the second set of points 650 in the target lane (e.g., the second lane 414). The method 500 may compute these two groups of the first set of points 642 and the second set of points 650 regardless of where the ego vehicle 420 crosses the dashed center line 416 for determining a drivable space.

At block 504, points representing the set of trajectories are divided into separate point sets according to a semantic structure of the same semantic driving maneuver. For example, as shown in FIG. 6B, dividing points into separate point sets of slices 670 are shown, including a first slice 672, a second slice 674 and a third slice 676. In this example, the first slice 672 includes the second set of points 650, the second slice 674 includes the first set of points 642, and the third slice 676 includes the third set of points 660. In aspects of the present disclosure, the first slice 672, the second slice 674, and the third slice 676 sort the larger set of points from the set of trajectories 640 into categories. These aspects of the present disclosure compute a drivable space using the slices of points associated with the set of trajectories 640.

At block 506, the points of each separate point set of the set of trajectories are aggregated to compute a lane segment for each separate point set. For example, FIG. 6C illustrates lane segments 680 generated by aggregations of the slices 670 shown in FIG. 6B to determine a drivable space 690, as shown in FIG. 6D. In this example, a first lane segment 686 is generated by aggregating the points of the first slice 672. Similarly, a second lane segment 684 is generated by aggregating the points of the second slice 674. In addition a third lane segment 682 is generated by aggregating the points of the third slice 676. As described, a lane segment may refer to the smallest polygon (e.g., rectangle) containing the points of a respective slice in the interior or a boundary of the polygon, as further illustrated in FIG. 7.

Figure 7:
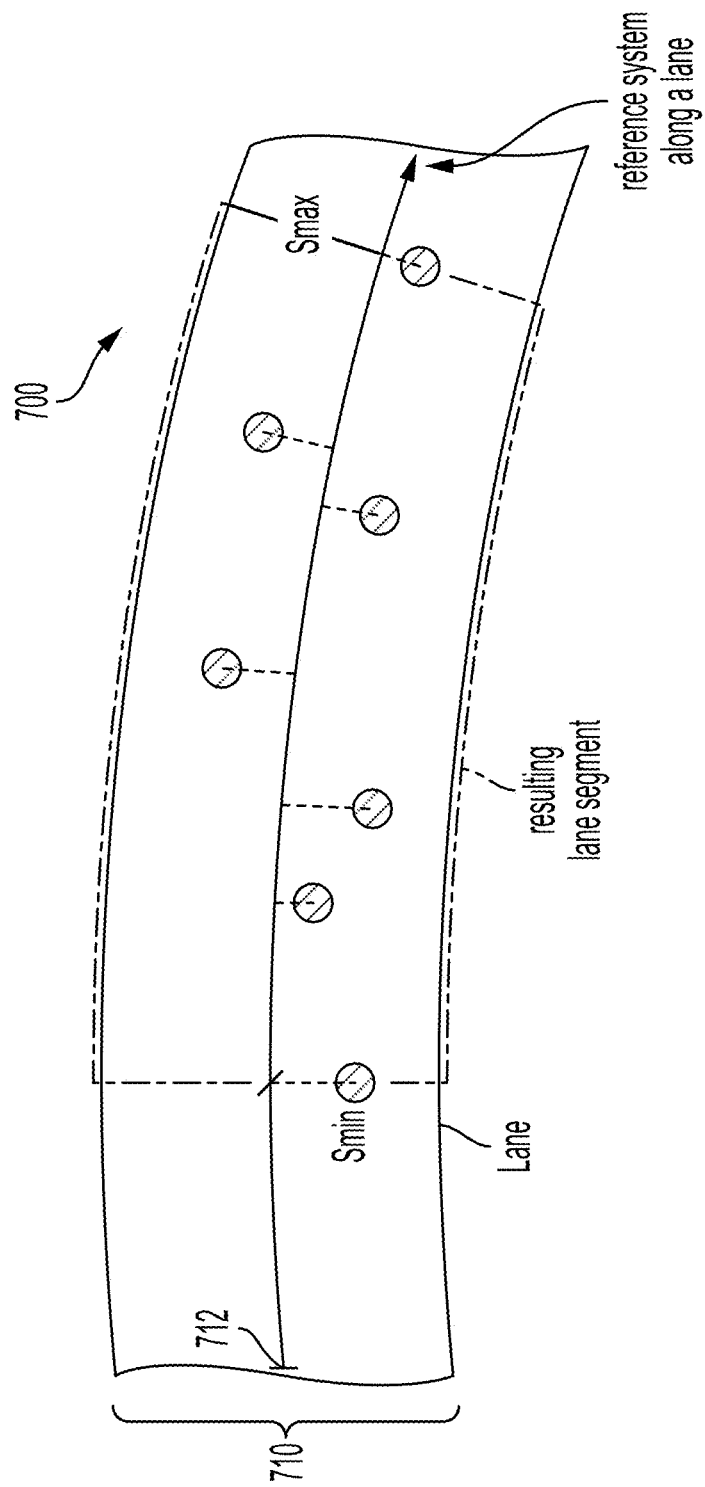
FIG. 7 is a block diagram further illustrating the formation of the lane segments of FIG. 6C, according to aspects of the present disclosure.

FIG. 7 is a block diagram further illustrating the formation of a lane segment of FIG. 6C, according to aspects of the present disclosure. In this example, given all the points of a particular slice, the points are projected on a roadway lane 710 that contains each of the points. A longitudinal reference system 712 is attached to the roadway lane 710 and, for each point, a curvilinear abscissa from projecting points of the particular slice is computed. The projection of the points indicates a minimum curvilinear abscissa value and a maximum curvilinear abscissa value (indicated with Smin and Smax in FIG. 7). These values are used to determine a "span of lane" that the maneuver (e.g., as defined by the input cluster of trajectories/slices) is allowed to occupy. In this example, the roadway lane 710 is "cropped" to produce a lane segment 700.

Referring again to FIG. 5, at block 508, a union is computed of each of the lane segments to obtain a drivable space and a related motion plan of the ego vehicle. Blocks 504 to 508 may be repeated if additional sets of trajectories are received at block 510. For example, as shown in FIG. 6D, a drivable space 690 of the ego vehicle 420 is formed as a union of the first lane segment 686, the second lane segment 684, and the third lane segment 682, as further illustrated in FIG. 8.

Figure 8:
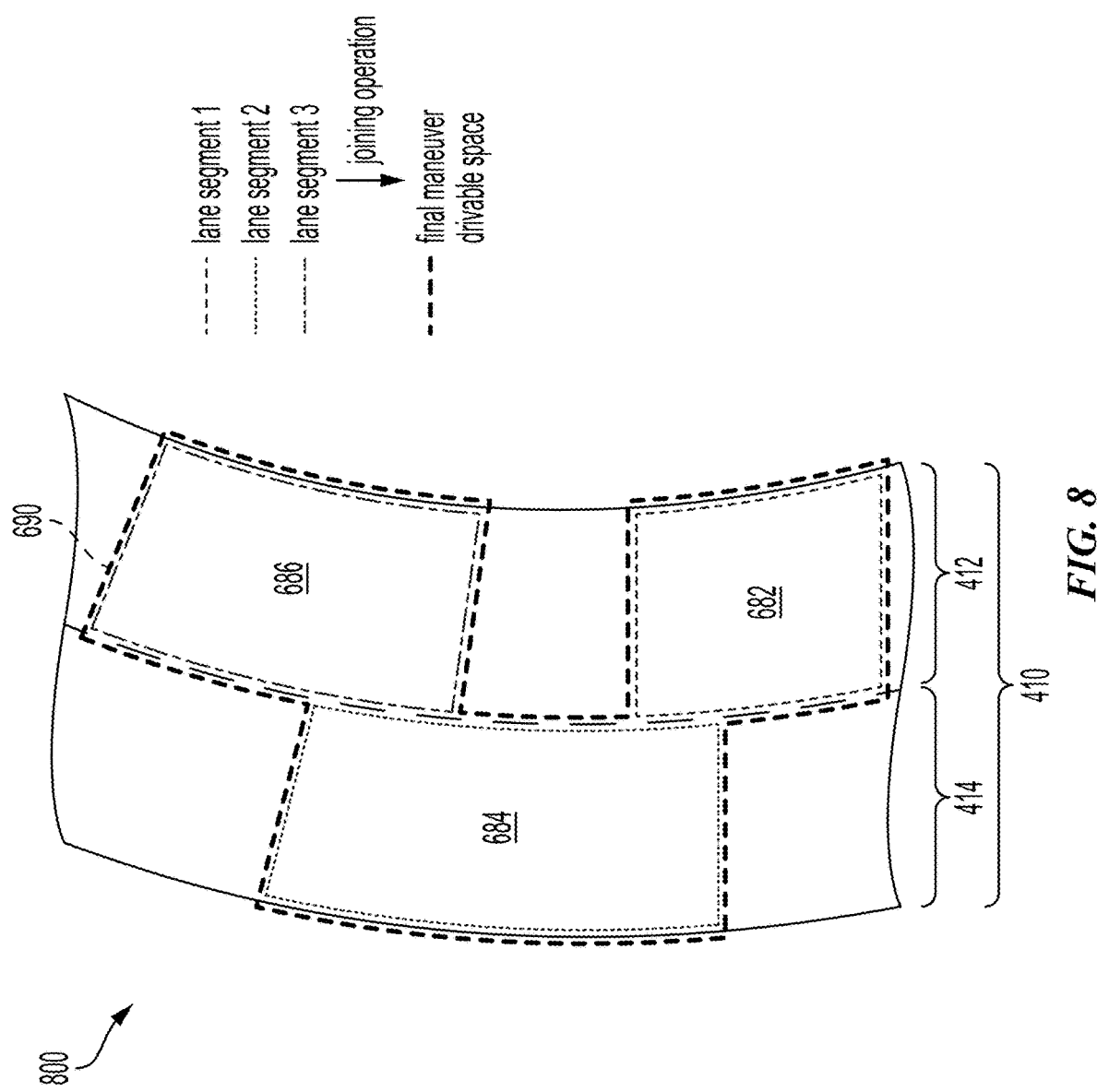
FIG. 8 is a block diagram further illustrating the formation of the drivable space of FIG. 6D, according to aspects of the present disclosure.

FIG. 8 is a block diagram further illustrating the formation of the drivable space 690 of FIG. 6D, according to aspects of the present disclosure. The final step (e.g., block 508) involves taking all the lane segments (e.g., 682, 684, 686) produced by each point slice (e.g., 672, 674, 676) and joining them together using geometric operations. The joining procedure works with pairs of segments (e.g., applied iteratively) and starts by identifying the segments relative positions in terms of which is the left lane segment and the right lane segment and which is the back segment and the front segment. Once the relative position is computed, three possible cases are identified: (1) the left lane segment and the right lane segment are aligned, (2) the left lane segment is the front segment, and (3) the left lane segment is the back segment.

For the first case (1), a result is computed by substituting the right border of the left lane segment with the right border of the right lane segment. The second and third cases (2) and (3) involve the determination of pre-extensions and post-extensions, which are the segment's regions that are not immediately adjacent to each other. To determine the pre-extension, the back segment is cut where the front segment begins. To determine the post-extension, the front segment is cut where the back segment begins. The result is built by appending the sequence of the pre-extensions, the adjacent regions and the post-extensions for the left and right borders. A final versions of the drivable space 690 represents the full drivable space that describes the generic maneuver deduced from the cluster of input trajectories.

Figure 9:
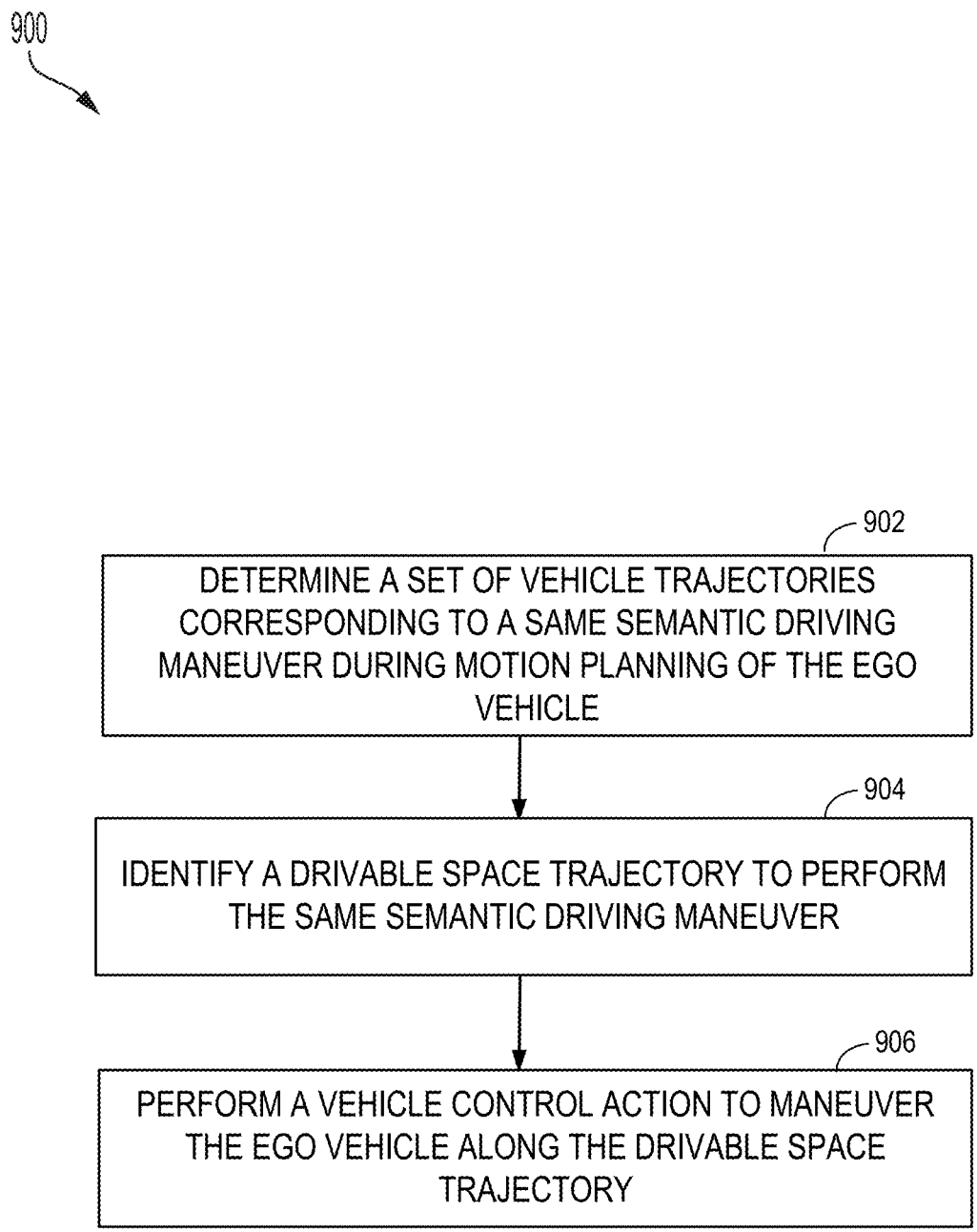
FIG. 9 is a flowchart illustrating a method of determining a drivable space of an ego vehicle, according to aspects of the present disclosure.

FIG. 9 is a flowchart illustrating a method of determining a drivable space of an ego vehicle, according to aspects of the present disclosure. A method 900 being at block 902, in which a set of trajectories corresponding to a same semantic driving maneuver are determined during motion planning of the ego vehicle. For example, as shown in the method 600 of FIG. 6A, the set of trajectories 640 are received and represent the selected driving maneuver 430 of FIG. 4. For example, as illustrated in step 1 of FIG. 6A, an action for a lane change involves crossing the dashed center line 416 that separates the first set of points 650 in the original lane (e.g., the first lane 412) from the second set of points 660 in the target lane (e.g., the second lane 414).

At block 904, a drivable space trajectory is identified to perform the same semantic driving maneuver. For example, as shown in FIG. 6D, a drivable space 690 of the ego vehicle 420 is formed as a union of the first lane segment 686, the second lane segment 684, and the third lane segment 682, as further illustrated in FIG. 8. For example, in FIG. 8 illustrates the formation of the drivable space 690 of FIG. 6D, according to aspects of the present disclosure. The final step involves taking all the lane segments (e.g., 682, 684, 686) produced by each point slice (e.g., 672, 674, 676) and joining them together using geometric operations. At block 906, a vehicle control action is performed to maneuver the ego vehicle along the drivable space trajectory.

The method 900 further includes selecting corresponding pairs of lane of segments; identifying, for the selected pair of corresponding lane segments, a left lane segment, a right lane segment, a front segment, and a back segment. The method 900 also includes combining a neighboring border span of the left lane segment, the right lane segment, the front segment, and the back segment to form the drivable space trajectory. The method 900 further includes identifying relative positions of the left lane segment, the right lane segment, the front segment, and the back segment; determining pre-extensions, post-extensions, and adjacent regions according to the relative positions of the left lane segment, the right lane segment, the front segment, and the back segment. The method 900 further includes appending a sequence of the pre-extensions, the adjacent regions and the post-extensions based on left and right borders of the left lane segment, the right lane segment, the front segment, and the back segment.

In some aspects, the methods shown in FIGS. 5 and 9 may be performed by the SOC 100 (FIG. 1) or the software architecture 200 (FIG. 2) of the autonomous vehicle 150. That is, each of the elements or methods may, for example, but without limitation, be performed by the SOC 100, the software architecture 200, the processor (e.g., CPU 102) and/or other components included therein of the autonomous vehicle 150, or the vehicle behavior control system 300.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of determining a drivable space trajectory of an ego vehicle, the method comprising:
    determining a set of vehicle trajectories corresponding to a same semantic driving maneuver during motion planning of the ego vehicle;
    dividing points representing the set of vehicle trajectories into separate point sets according to a semantic structure of the same semantic driving maneuver;
    selecting a point set corresponding to the lane segment;
    projecting points of a selected point set corresponding to the lane segment on a roadway lane;
    defining a longitudinal reference system attached to the roadway lane;
    computing, for each point of the selected point set, a curvilinear abscissa of a projection of the points of the selected point set to form the lane segment;
    aggregating the points of each separate point set of the set of trajectories to compute a lane segment for each point set by repeating the projecting and computing for each point set;
    computing a union of each of the lane segments to obtain the drivable space trajectory and a related motion plan of the ego vehicle;
    and
    performing a vehicle control action to maneuver the ego vehicle along the drivable space trajectory.

2. The method of claim 1, further comprising repeating the selecting, projecting, defining, and computing for each point set.

3. The method of claim 1, in which computing comprises:
    identifying, according to the projection of the points, a minimum curvilinear abscissa value and a maximum curvilinear abscissa value;
    determining a span of the lane segment in which the ego vehicle may occupy to perform the same semantic driving maneuver; and
    cropping the roadway lane to form the lane segment.

4. The method of claim 1, in which computing the union comprises:
    selecting each of the lane segments; and
    joining each of the lane segments using geometric operations to form a drivable space representing the same semantic driving maneuver.

5. The method of claim 4, in which joining comprises:
    selecting corresponding pairs of lane of segments;
    identifying, for the selected pair of corresponding lane segments, a left lane segment, a right lane segment, a front segment, and a back segment; and
    combining a neighboring border span of the left lane segment, the right lane segment, the front segment, and the back segment to form the drivable space trajectory.

6. The method of claim 5, in which combining comprises:
    identifying relative positions of the left lane segment, the right lane segment, the front segment, and the back segment;
    determining pre-extensions, post-extensions, and adjacent regions according to the relative positions of the left lane segment, the right lane segment, the front segment, and the back segment; and
    appending a sequence of the pre-extensions, the adjacent regions and the post-extensions based on left and right borders of the left lane segment, the right lane segment, the front segment, and the back segment.

7. A non-transitory computer-readable medium having program code recorded thereon to determine a drivable space trajectory of an ego vehicle, the program code being executed by a processor and comprising:
    program code to determine a set of vehicle trajectories corresponding to a same semantic driving maneuver during motion planning of the ego vehicle;
    program code to divide points representing the set of vehicle trajectories into separate point sets according to a semantic structure of the same semantic driving maneuver;
    program code to select a point set corresponding to the lane segment;
    program code to project points of a selected point set corresponding to the lane segment on a roadway lane;
    program code to define a longitudinal reference system attached to the roadway lane;

program code to compute, for each point of the selected point set, a curvilinear abscissa of a projection of the points of the selected point set to form the lane segment;

program code to aggregate the points of each separate point set of the set of trajectories to compute a lane segment for each point set by repeating the projecting and computing for each point set;

program code to compute a union of each of the lane segments to obtain the drivable space trajectory and a related motion plan of the ego vehicle; and program code to perform a vehicle control action to maneuver the ego vehicle along the drivable space trajectory.

8. The non-transitory computer-readable medium of claim 7, further comprising program code to repeat the program code to select, the program code to project, the program code to define, and the program code to compute for each point set.

9. The non-transitory computer-readable medium of claim 7, in which the program code to compute comprises:

program code to identify, according to the projection of the points, a minimum curvilinear abscissa value and a maximum curvilinear abscissa value;

program code to determine a span of the lane segment in which the ego vehicle may occupy to perform the same semantic driving maneuver; and program code to crop the roadway lane to form the lane segment.

10. The non-transitory computer-readable medium of claim 7, in which the program code to compute the union comprises:

program code to select each of the lane segments; and program code to join each of the lane segments using geometric operations to form a drivable space representing the same semantic driving maneuver.

11. The non-transitory computer-readable medium of claim 10, in which the program code to join comprises:

program code to select corresponding pairs of lane of segments;

program code to identify, for the selected pair of corresponding lane segments, a left lane segment, a right lane segment, a front segment, and a back segment; and program code to combine a neighboring border span of the left lane segment, the right lane segment, the front segment, and the back segment to form the drivable space trajectory.

12. The non-transitory computer-readable medium of claim 11, in which the program code to combine comprises:

program code to identify relative positions of the left lane segment, the right lane segment, the front segment, and the back segment;

program code to determine pre-extensions, post-extensions, and adjacent regions according to the relative positions of the left lane segment, the right lane segment, the front segment, and the back segment; and program code to append a sequence of the pre-extensions, the adjacent regions and the post-extensions based on left and right borders of the left lane segment, the right lane segment, the front segment, and the back segment.

13. A system to determine a drivable space trajectory of an ego vehicle, the system comprising:

a vehicle trajectory aggregation module to determine a set of vehicle trajectories corresponding to a same semantic driving maneuver during motion planning of the ego vehicle;

a drivable trajectory identification module to divide points representing the set of vehicle trajectories into separate point sets according to a semantic structure of the same semantic driving maneuver, to select a point set corresponding to the lane segment, to project points of a selected point set corresponding to the lane segment on a roadway lane, to define a longitudinal reference system attached to the roadway lane, to compute, for each point of the selected point set, a curvilinear abscissa of a projection of the points of the selected point set to form the lane segment, aggregate the points of each separate point set of the set of trajectories to compute a lane segment for each point set by repeating the projecting and computing for each point set, and to compute a union of each of the lane segments to obtain the drivable space trajectory and a related motion plan of the ego vehicle; and a vehicle control selection module to perform a vehicle control action to maneuver the ego vehicle along the drivable space trajectory.

14. The system of claim 13, further comprising a planner module to plan a trajectory of the ego vehicle according to the vehicle control action.

* * * * *